United States Patent [19]

Lakes

[11] 4,079,512

[45] Mar. 21, 1978

[54] CORE LAMINATION SELECTING APPARATUS

[76] Inventor: Lee J. Lakes, 1023 Sherwood Dr., Bluffton, Ind. 46714

[21] Appl. No.: 692,358

[22] Filed: Jun. 3, 1976

[51] Int. Cl.$^2$ ............................................. H02K 15/02
[52] U.S. Cl. ........................................ 29/732; 29/596; 29/738; 214/8.5 C; 214/8.5 SS
[58] Field of Search ............ 29/203 L, 205 D, 205 R, 29/596, 598, 609, 732, 736, 738; 214/8.5 C, 8.5 SS

[56] References Cited

U.S. PATENT DOCUMENTS

| | | | |
|---|---|---|---|
| 3,006,062 | 10/1961 | Loy | 29/203 L |
| 3,926,320 | 12/1975 | Shively et al. | 214/8.5 C |

Primary Examiner—Carl E. Hall
Attorney, Agent, or Firm—Gust, Irish, Jeffers & Rickert

[57] ABSTRACT

A supporting mandrel receives a plurality of electrical motor core laminations in columnar relation. An overhead ram carrying a ram head is in movable relation towards and away from the supporting mandrel along the columnar axis. A cylinder is formed in the ram head opening towards the supporting mandrel. A piston is reciprocably mounted in the cylinder and is coupled in force transmitting relation to the upper end of said column. Selectively releasable fluid pressure is operable to move the piston toward the supporting mandrel for compressing the laminations in the column. Coplanar pick-off fingers are mounted in an axially aligned member and are movable in a radial direction relative the axis and exert a holding force to at least one lamination. The plane of the fingers is spaced a predetermined axial distance from the upper column end defining a predetermined stack height of laminations. The holding force is maintained until the fluid pressure to the piston is released. The stack is then lifted and retaining means engage the stack while it is moved to a second subsequent station to prevent droppage of any laminations in the stack.

22 Claims, 15 Drawing Figures

CORE LAMINATION SELECTING APPARATUS

BACKGROUND OF THE INVENTION

1. Field of the Invention

This invention is in the field of manufacture of stator and rotor cores, and in particular the selection of a predetermined columnar dimension of stator and rotor core laminations prior to cleating and winding thereof.

2. Brief Statement of the Prior Art

In the manufacture of electric motors, it is common practice to form the rotor and stator cores of laminations of ferro-magnetic material. The stator and rotor are formed with radial slots in which are wound insulated electrical conductors. Proper winding and energization of the conductors will result in interacting magnetic and electrical fields to provide motor torque according to well-known principles. In the manufacture of these motors, it is important that the rotor and stators be accurately dimensioned. This requires the proper number of laminations to be selected for the core. The laminations are formed in a stamping operation wherein lamination irregularities in the form of burrs and the like frequently occur. Also, lamination warpage make core assembly difficult. Therefore, it is conventional practice to compress the laminations with a considerable axial force in order to remove the irregularities. However, maintaining the substantial compressive force while selecting and lifting lamination stack frequently would cause the bottom lamination to spring free, resulting in a lamination loss and improper core dimension.

SUMMARY OF THE INVENTION

A plurality of stator or rotor core annular laminations are stacked in a column on a supporting or bottom cam. The laminations have radial slots formed therein providing pole pieces therebetween for receiving pole windings as is well known in the art. An overhead ram is mounted in reciprocable relation to the supporting ram along the column axis and carries a ram head at its lower extremity. The ram head has formed therein a downwardly opening cylinder and a ram piston is reciprocably mounted in the cylinder and resiliently urged to an upper or raised position. A fluid pressure source is provided to operate the overhead ram and to move the ram piston in a downwardly direction. The downward force applied to the ram piston is greater than the downward force applied to the overhead ram for reasons to become apparent.

A plurality of pick-off fingers are mounted for reciprocable movement radially of the column axis in a plane that is a predetermined, stack-height defining, distance to the ram head. Spacers are used to adjust this distance and hence the stack-height, as desired. The pick-off fingers are mounted in the wall of a tubular mandrel which is insertable centrally of the annular lamination column. A camming mandrel is mounted within, and for rotation relative to, the tubular mandrel and has camming lobes which are engageable with the fingers and urge the fingers outwardly against the edges of the laminations upon rotation of the camming mandrel relative to the tubular mandrel. A rotary actuator is mounted for imparting rotation to the camming mandrel in predetermined arcuate segments.

Elongated axially parallel slots are formed in the tubular mandrel. Mounted in each slot for reciprocable movement in a direction radially of the axis, is an elongated arbor blade which is resiliently urged to an inward radial position. Selected ones of the arbor blades have radially extending axially parallel alignment keys. The key width in the plane of the lamination corresponds to the slot width in the lamination and the key is insertable in the slot. However, the blade width in the plane of the lamination is greater than a slot width and is engageable with the lamination edges between the slots to exert an outward radial force thereagainst. A second plurality of camming lobes is formed on the camming mandrel and engageable with the arbor blades upon rotation of the camming mandrel relative the tubular mandrel to force the arbor blades outwardly against the inner edges of the annular laminations during a second arcuate segment of camming mandrel rotation. The arbor blades extend axially from above the selected stack-height to a point just below the pick-off fingers.

In operation, the laminations are stacked in columnar array on the bottom supporting mandrel; fluid pressure is applied to the ram piston; the overhead ram is lowered towards the column; the tubular mandrel is inserted into the lamination column opening along with the alignment keys which fit into the slots to maintain alignment of the laminations until the ram piston engages the top lamination in the column; the overhead ram continues under fluid pressure to compress the laminations; after compression, the camming mandrel rotary actuator is rotated a first increment causing the first plurality of camming lobes to act against the inner radial ends of the pick-off fingers to force them outwardly against the inner edges of a lamination a predetermined distance from the ram head, thereby defining a stack-height, while the laminations are under axial pressure. The ram piston and the overhead ram pressure are released simultaneously removing the axial pressure, simultaneously pressure is applied to raise the overhead ram thereby permitting the stack to expand under its spring force, this upward expansion occuring upwardly from the lamination or laminations engaged by the pick-off fingers. After the mandrel has raised sufficiently to clear the laminations remaining in the magazine (those laminations below those picked off by the fingers), the camming mandrel is rotated a second increment moving the blades outwardly against the inner edges of the laminations, that portion of the blades extending beneath the pick-off fingers acting as a safety to capture any laminations that may fall from the pick-off fingers during stack raising and transfer to another location. The overhead ram and lamination stack are then removed to a second station where the stack may be welded, cleated, or otherwise treated; the actuator then reverses rotation of the camming mandrel a total of the first and second increments back to the initial position, releasing the stack; the overhead ram is then returned to a position over the bottom ram for another stack-height selection sequence. If desired a second overhead ram may be utilized to perform stack-height selection while the first overhead ram is unloading the first stack-height. Since a greater force was applied to the ram piston than to the overhead ram, no axial movement of the ram piston relative the overhead ram will take place during the compressing operation.

In a second embodiment, the mechanical camming is replaced by fluid pressure actuation. The pick-off fingers are mounted for reciprocable movement in a plane spaced from the ram head a predetermined, stack-height defining distance, and movable radially of the column axis under fluid pressure. In this embodiment, a second set, or safety set, of fingers is reciprocably mounted in a transverse plane for movement radially of the column axis in a plane spaced just below the plane of the pick-off fingers. The pick-off fingers and safety fingers are mounted in a collar which is in fixed relation to the overhead ram. In operation of this embodiment, the overhead ram applies a compressive force to the lamination stack, with the ram piston engaging the top lamination in the columnar stack. The pick-off fingers are moved inwardly towards the lamination stack while the compressive force is maintained on the stack; the ram piston pressure is released; the overhead ram is raised and simultaneously the safety fingers move inwardly to capture any laminations which may fall from the grip of the pick-off fingers during stack raising and transfer to a second station.

For both embodiments, upon final assembly of the selected laminations into a cleated or welded core, the core length will be equal to the previously selected stack height provided the same compressing force is used on the laminations in the final assembly as was used in selecting the stack height.

It is therefore an object of this invention to provide a method and apparatus for selecting a predetermined stack-height of stator or rotor core laminations that reliably and consistently will select the exact number of laminations required to constitute the desired stack-height in the finally assembled core.

It is a further object of this invention to provide in the method and apparatus of the previous object a compression member that is releasable prior to the lifting of the stack from the supporting member.

It is a further object of this invention to provide in the method and apparatus of the previous object stack-height selection which will insure retention of all laminations during the lifting and transfer of the stack to a second station.

The above-mentioned and other features and objects of this invention and the manner of attaining them will become more apparent and the invention itself will be best understood by reference to the following description of an embodiment of the invention taken in conjunction with the accompanying drawings.

DESCRIPTION OF PREFERRED EMBODIMENTS

Figures 1, 3, 4, 4A, 5, 5A:
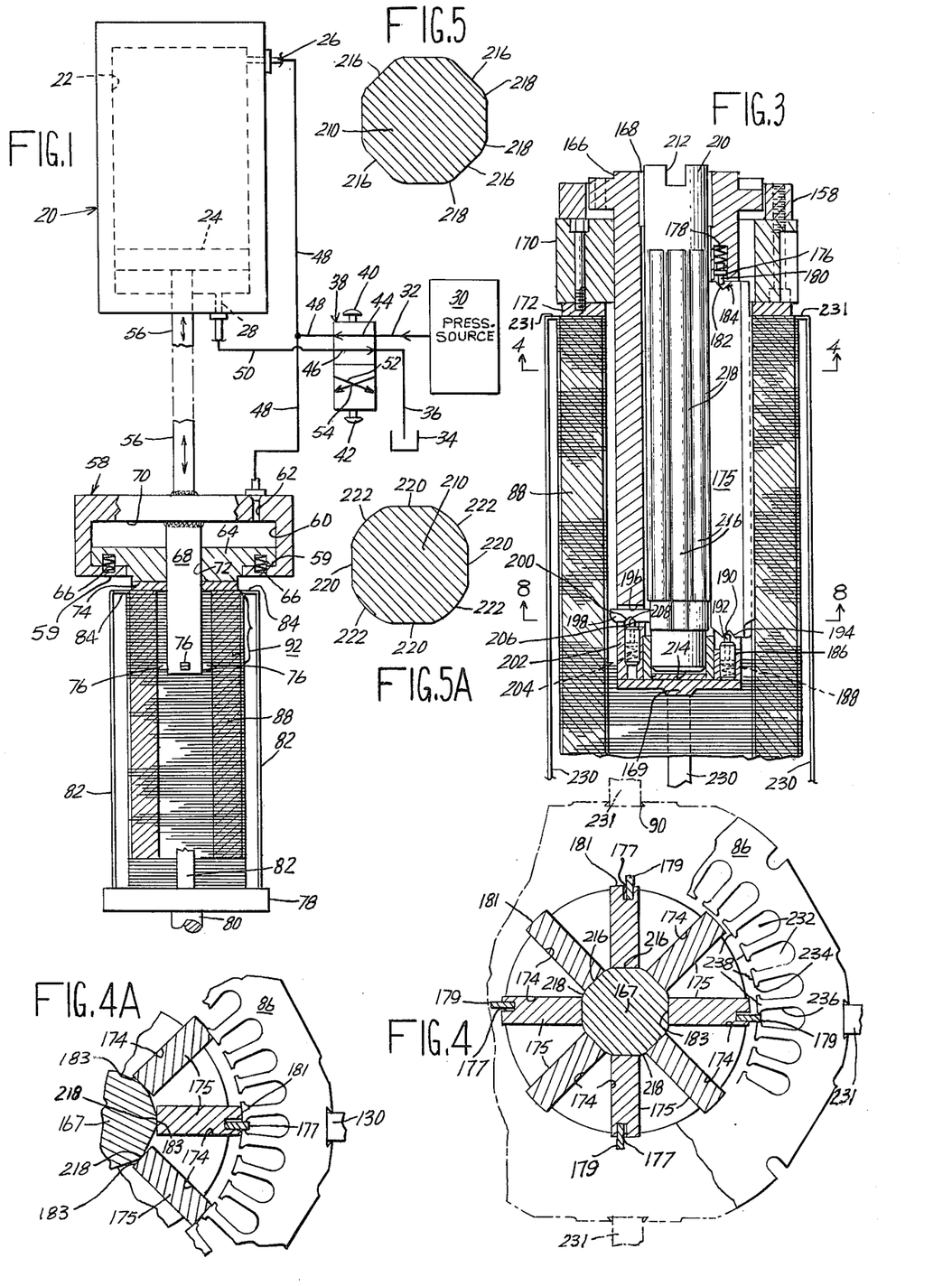
FIG. 1 is a partial schematic and block diagram, partially sectioned view of a preferred embodiment of this invention.
FIG. 3 is a partial, sectioned view of the lower portion of the embodiment of FIG. 2.
FIG. 4 is an enlarged partial section taken at 4—4 of FIG. 3.
FIG. 4A is an enlarged partial view similar to the view of FIG. 4 wherein the embodiment is shown in an alternate position.
FIG. 5 is a sectioned view of the camming mandrel showing the arbor blade cams.
FIG. 5A is a sectioned view of the camming mandrel showing the pick-off finger cams.

Referring to FIG. 1, a double-acting fluid actuator 20 has a cylinder 22 formed therein and a piston 24 is reciprocably and slidably mounted in cylinder 22. Actuator 20 has a fluid port 26 at its upper end and a fluid port 28 at its lower end. A pressure source 30 develops hydraulic or pneumatic pressure in line 32 and a reservoir 34 is in fluid communication with a line 36. A reversing valve 38 having buttons 40 and 42 at the upper and lower ends thereof respectively is mounted for movement between an upper and lower position. A line 48 is in fluid communication with port 25 and a line 50 is in fluid communication with port 28. In the lower position of valve 38, a passage 44 registers with lines 32 and 48 and a passage 46 registers with lines 36 and 50, establishing fluid communication between the fluid pressure in line 32 and the upper side of piston 24 and establishing fluid communication between the underside of piston 24 and reservoir 34 causing downward movement of piston 24. When valve 38 is in its upper position, valve passage 52 registers with lines 48 and 36 causing fluid communication between the upper side of piston 24 and reservoir 34 through line 36, and valve passage 54 registers with lines 50 and 32 causing fluid communication between the pressure source 30 and the underside of piston 24, causing piston 24 to move upwardly in cylinder 22.

Piston rod 56 is affixed to the lower side of piston 24 and is also affixed to the upper surface of a housing 58. An annular lip 59 is formed at the lower end of housing 58. Cylinder 60 is formed in housing 58 and has a fluid port 62 formed therein which is in fluid communication with line 48. A piston 64 is reciprocably and slidably mounted in cylinder 60. The effective area of piston 64 is greater than the effective area of piston 24 so that more force is developed on piston 64 than piston 24. This insures bottoming of piston 64 against lip 59 during downward travel of piston 24. A spring member 66 is mounted between lip 59 and the underside of piston 64 urging piston 64 in an upwardly direction. An elongate mandrel 68 is affixed as by welding to inner surface 70 of cylinder 60 and extends through in slidable relation to a bore 72 in piston 64. An annular spacer 74 is slidably mounted on mandrel 68 and four coplanar fingers 76 are reciprocably mounted in equally spaced slots the lower portion of mandrel 68 and are forcibly movable radially outwardly of the longitudinal axis of mandrel 68 by means not shown in FIG. 1 but which may take the form of the means shown in the embodiments of FIGS. 2-12.

A bottom ram 78 has a post 80 which is supported by means not shown. Four vertical arms 82 spaced at 90° intervals are mounted on ram 78, each of which have alignment tabs 84 formed at right angles to the respective upper ends thereof. A plurality of stator laminations, each of which may be similar to lamination 86, shown in FIG. 4, are aligned and stacked in a vertical magazine column 88 supported on ram 78. Alignment is aided by causing indentations 90 in lamination 86 to register with tabs 84 as the laminations are dropped onto ram 78.

Once the column 88 has been formed on ram 78, valve 38 is placed in its lower position, as by applying manual force to button 40, causing fluid pressure to be applied to the upper sides of pistons 24 and 64. The piston 64 is forced in a downward direction against spring 66 until it contacts lip 59. Piston 24 continues its downward movement until spacer 74 contacts the upper lamination 86 in column 88 and continues this movement until the laminations in column 88 are compacted, removing all irregularities. Then, fingers 76 are caused to move outwardly under pressure by means not shown but which may be by mechanical camming or fluid pressure, as shown in embodiments later described, to thereby define a stack 92 of laminations as shown by the bracket, the height of which corresponds to the vertical distance between fingers 76 and spacer 74. By varying the vertical dimension of spacer 74, the height of stack 92 may be varied as desired.

Valve 38 is then moved to its upper position as by applying pressure to button 42, so that fluid pressure is relieved from the upper side of pistons 24 and 64 and fluid pressure is applied to the underside of piston 24 causing it to rise. Spring 66 raises piston 64 removing pressure from the uppermost lamination in stack 92 so that during the raising movement of piston 24, the laminations 86 will not be forced off of the holding fingers 76. Once the piston 24 has been raised a desired distance, the fingers 76 are moved radially inwardly releasing the radial force on the lowermost lamination in stack 92 whereby stack 92 may be removed from mandrel 68. Valve 38 then may be moved downwardly to its lower position as by pressure on button 40 repeating the cycle and causing a second stack 92 to be removed from lamination column 88.

Referring now to FIGS. 2-8A, an embodiment having a camming mandrel for extending fingers 76 will be shown and described. A post 100 is mounted for rotation about its vertical axis and is rotatable by a rotator 102 which is mechanically coupled to post 100. A sleeve 104 is keyed to post 100 and is rotatably driven thereby but is reciprocably slidable therealong. An upper arm 106 is affixed to and extends horizontally from sleeve 104 and the lower arm 108 is in vertical alignment with and spaced downwardly from arm 106 and also is affixed to sleeve 104. Vertical spacer pillar 110 is connected as by bolt 112 to arm 106 and is similarly connected to arm 108. A socket 107 is formed in the upper side of arm 106 and receives a rod 56a which is actuated similarly to rod 56 in FIG. 1.

Figures 2, 6:
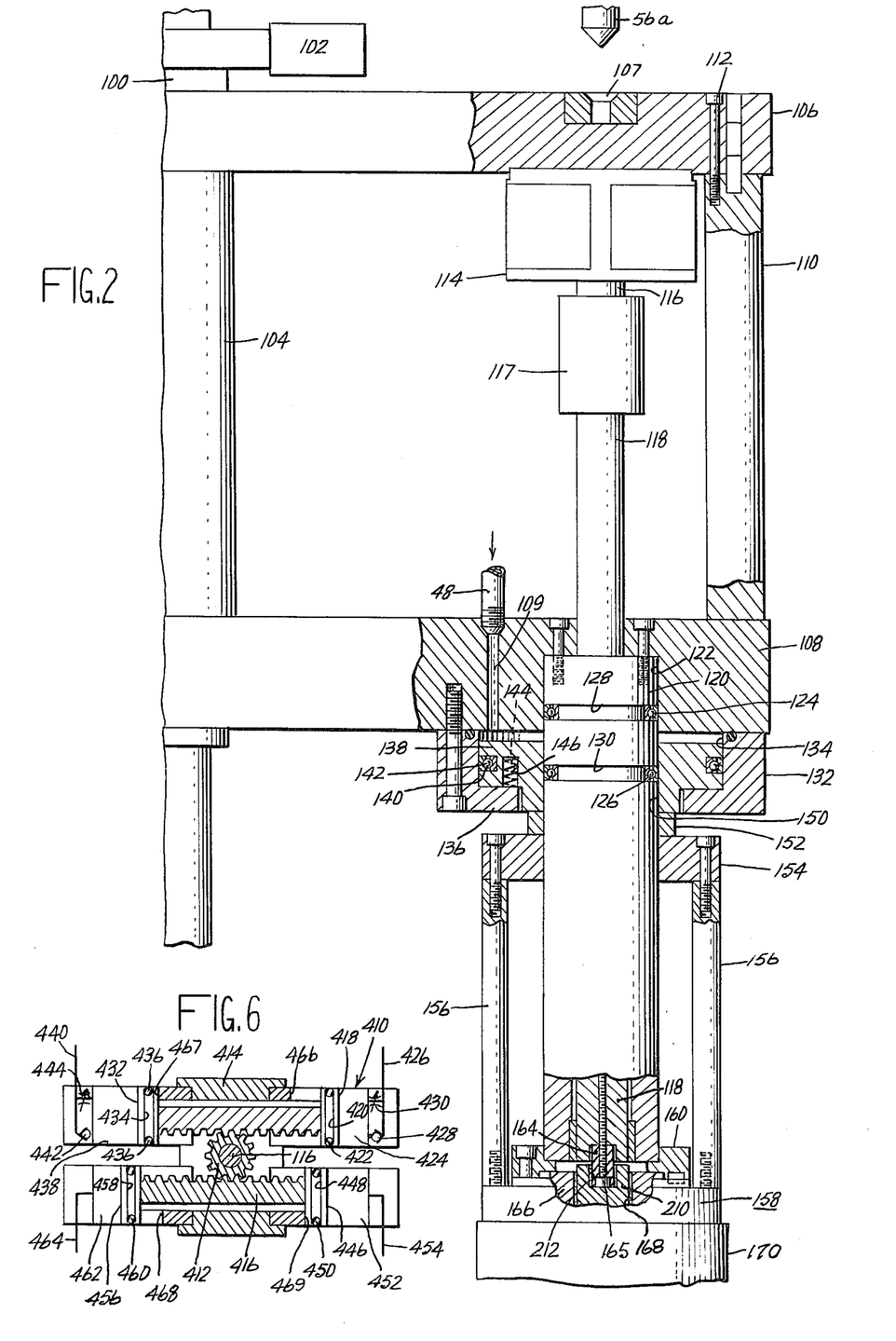
FIG. 2 is a partial, sectioned view of the upper portion of a preferred embodiment of this invention.
FIG. 6 is a partial, sectioned view of a rotary actuator that may be used with the embodiment shown in FIGS. 2-8A.

A rotary actuator 114, which may be any commercially available actuator that can impart predetermined sequences of arcuate rotation and which may take the form of the actuator shown in FIG. 6, is mounted in fixed relation to the underside of arm 106.

Rotary actuator 114 may take the form of that shown in FIG. 6, now described. Housing 410 has rotatably mounted centrally therein rod 116 to which is affixed a gear 412. The teeth of a gear rack 414 are meshed with the teeth of gear 412 and rack 414 is mounted for reciprocable horizontal movement in housing 410. The teeth of a gear rack 416 are also meshed with gear 412 and rack 416 is also mounted for reciprocable horizontal movement in housing 410. A free piston 418 has a peripheral groove 420 in which is seated 0-ring 422 in fluid-sealing relation with a cylinder 424 in which piston 418 is reciprocably and slidably movable. Fluid line 426 communicates with cylinder 424 through one way valve 428 and variable restricted orifice 430. Rack 414 is not attached to piston 418 but is abuttable thereagainst and movable thereby in a leftward direction. Similarly, a free piston 432 has a peripheral groove 434 in which is sealed 0-ring 436 in fluid-sealing relation with a cylinder 438 in which piston 432 is reciprocably and slidably movable. Fluid line 440 communicates with cylinder 438 through one-way valve 442 and variable restricted orifice 444. Rack 414 is not attached to piston 432 but is abuttable thereagainst and movable thereby in a rightward direction.

A free piston 446 has a peripheral groove 448 in which is seated 0-ring 450 in fluid-sealing engagement with a cylinder 452 in which piston 448 is reciprocably and slidably mounted. A fluid line 454 communicates with cylinder 452. Rack 416 is not attached to piston 446 but is abuttable thereagainst and movable thereby in a leftward direction. A free piston 456 has a peripheral groove 458 in which is seated an 0-ring 460 in fluid sealing engagement with a cylinder 462 in which piston 456 is reciprocably and slidably mounted. A fluid line 464 communicates with cylinder 462. A piston stop 466 is formed in housing 410 for restricting leftward movement of piston 418. A piston stop 468 is formed in housing 410 for restricting rightward movement of piston 456.

In operation of the embodiment of FIG. 6, fluid pressure is applied to line 426 and is communicated through one-way valve 428 to cylinder 424 urging piston 418 leftwardly until it abuts stop 466 moving rack 414 leftwardly and rotating gear 412 and rod 116 counterclockwise 45°. Then, after a predetermined interval, fluid pressure is applied to line 464 and cylinder 462 moving piston 456 and rack 416 rightwardly, rotating gear 412 and rod 116 until piston 456 abuts stop 468 after which rod 116 will have been rotated an additional 22½° in a counterclockwise direction. This will also cause rack 414 to move leftwardly a corresponding amount which it can do since it is not attached to piston 418 and is not restrained from leftward movement thereby. Thus, predetermined sequential incremental rotative movements can be imparted to rod 116 as desired by adjusting the position of stops 466 and 468. Application of fluid pressure to lines 440 and 454 will cause racks 414 and 416 to move to their original positions against stops 467 and 469, respectively, formed in housing 410. Thus, gear 412 and rod 116 are caused to rotate 67½° in a clockwise direction. A valve of this design is obtainable from PHD, Inc., Fort Wayne, Indiana.

Actuator 114 is in rotatably driving relation to rod 116 which is coupled by coupler 117 in rotating driving relation to rod 118. Bolted in fixed relation to arm 108 is a tubular rod 120 which is fitted in and depends from a cylindrical cavity 122 in arm 108. 0-rings 124 and 126 are seated in grooves 128 and 130, respectively, of rod 120. As will become apparent, rings 124 and 126 act as fluid seals. A cylinder casing 132 having a cylinder 134 formed therein has an annular lip 136 formed at the lower end thereof and is bolted to the underside of arm 108. Reciprocably mounted in cylinder 134 is piston 138 having a peripheral groove 140 formed therein for carrying 0-ring 142 which acts as a fluid seal with the walls of clyinder 134. Spring 144 is mounted in spring slot 146 in piston 138 and acts against lip 136 to urge piston 138 in an upward direction. Bore 150 is formed in piston 138 and receives in sliding relation rod 120.

Spacer ring 152 is slidably mounted on rod 120 as is slide ring 154. A plurality of pillars 156 are bolted at their upper ends to ring 154 and depend therefrom and are bolted at their lower ends to a lower slide ring 158 which is bolted to a mounting ring 160. The lower end of rod 120 seats in ring 160.

Rotatably mounted within the open shaft of rod 120 is actuator rod 118. The lower end of rod 118 has a key slot 162 which receives a rod key 164 which is held therein by socket head screw 165. The upper end of tubular mandrel 166 has an open shaft 168. Bolted to the underside of ring 158 is pressure sleeve 170 which, in turn, is bolted to the underside thereof pressure ring 172 (FIG. 3). As will be understood, ring 172 bears against the top lamination in column 88.

Mandrel 166 has a plurality of elongated radial slots 174 (FIG. 4) formed therein. An elongate arbor blade 175 is mounted in each slot 174 and is reciprocable in a radial direction from the mandrel 166 axis. Alternate blades 175 have elongate grooves 177 formed therein and receive in fixed relation elongate alignment keys 179 which extend radially beyond the end edges 181 of blades 175. At the top of each slot 174 in mandrel 166 is a spring-loaded plunger 176 (FIG. 3) urged by spring 178 in a downward direction with the end 180 of plunger 176 riding on an inclined surface 182 of V-notch 184 formed in the top edge of each arbor blade 175. At the lower end of each slot 174 in mandrel 166 is a spring-urged plunger 186 (FIGS. 3 and 7) which is urged in an upward direction by spring 188 with the plunger end 190 riding against inclined surface 192 of a V-notch 194 formed in the lower edge of each blade 175. It will be understood by those skilled in the art that blades 175 will be urged in an inward radial direction by plungers 180 and 186.

Formed at the lower end of mandrel 166 are four radial bores 196 (FIGS. 3, 7 and 8) each arcuately spaced 90° from the next adjacent bore. Reciprocably mounted in each bore 196 is a pick-off finger 198 having a V-shaped notch 200 formed intermediately along the lower edge thereof. A plunger 202 is reciprocably mounted in mandrel 166 and is spring-urged in an upwardly direction by a spring 204. End 206 of plunger 202 rides against inclined side 208 of notch 200 thereby urging fingers 198 in an inwardly radial direction.

Figure 7:
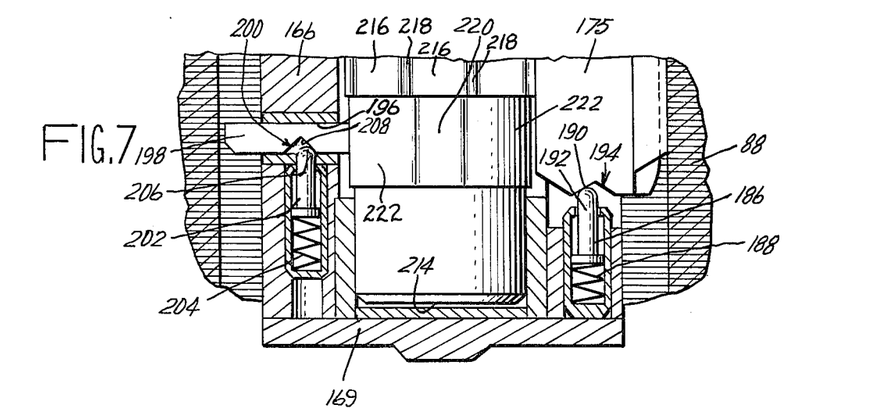
FIG. 7 is an enlarged, partial, sectioned view illustrating the lower portion of the camming mandrel operating against an arbor blade and a pick-off finger.
Figure 8:
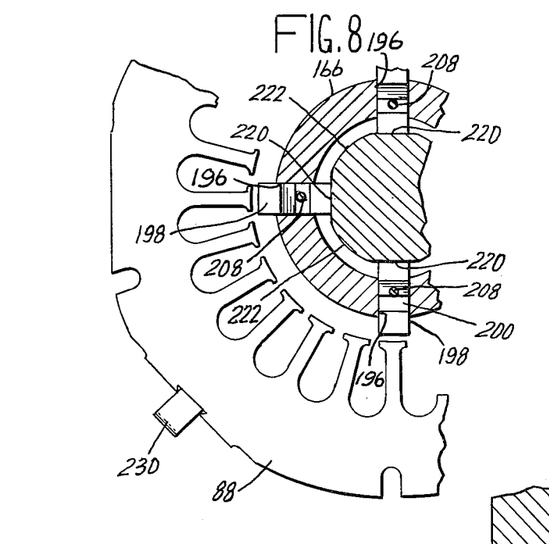
FIG. 8 is an enlarged, partial section taken at 8—8 in FIG. 3.

A camming mandrel 210 (FIG. 3) is rotatably mounted in shaft 168 and has a key slot 212 for receiving key 164 (FIG. 2) whereby a rotatable driving relation is imparted between rod 118 and camming mandrel 210. The lower surface 214 of mandrel 210 is rotatably supported by bottom plate 169 of mandrel 166. Elongate flats 216 (FIGS. 3, 4 and 5) are formed on mandrel 210 and have elongate lobes 218 formed between adjacent flats 216. The inner edges 183 (FIG. 4A) of arbor blades 175 ride alternately on flats 216 and lobes 218 as mandrel 210 is rotated relative mandrel 166. Formed below flats 216 and lobes 218 on mandrel 210 are four flats 220 separated by lobes 222 (FIGS. 7 and 8). The inner edges of fingers 198 ride alternately on flats 220 and lobes 222 as camming mandrel 210 is rotated. Supported on and upstanding from a lower ram, not shown in FIG. 3, are four alignment strips 230 which are spaced 90° apart and have tabs 231 at the upper ends thereof which are received in indents 90 in annular laminations 86. Each lamination 86 has a plurality of radial slots 232 (FIG. 4) having openings 234 radially inwardly thereof. Formed between slots 232 are poles 236 and at the end of each pole 236 is an enlarged foot 238. As will become apparent, alignment keys 179 are insertable in openings 234 but arbor blades 175 are not.

Figure 8A:
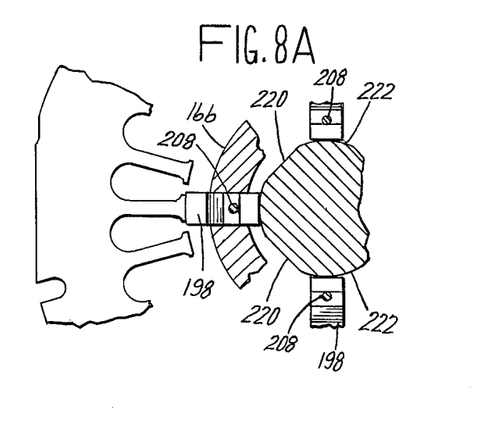
FIG. 8A is an enlarged, partial section similar to that in FIG. 8 with the camming mandrel in an alternative position.

In operation of the embodiment shown in FIGS. 1-8A, a magazine column 88 of laminations 86 is formed in columnar alignment by registering indents 90 with tabs 231 of alignment strips 130. Once the column 88 has been so aligned, arms 106 and 108 are slidably lowered by the downward movement of rod 56a against socket 107 on post 100 due to application of fluid pressure from line 48 to port 26 in actuator 20 until mandrels 166 and 210 enter the open center of column 88 and pressure ring 172 contacts the top lamination 86 in column 88. As mandrel 166 is lowered, alignment keys 179 enter openings 234 for further alignment of laminations 86. As shown for the embodiment of FIG. 1, fluid pressure is also applied through port 109 in arm 108 from line 48 to force piston 138 downwardly against the force of spring 146 until it abuts lip 136. The force applied to piston 138 is greater than that applied to rod 56a. Sufficient pressure is applied to arm 106 to remove any irregularities of the laminations in column 88. Then rotary actuator 114 turns rods 116 and 118 and mandrel 210 arcuately 45° until lobes 222 are centered on the inner ends of fingers 198 thereby forcing fingers 198 radially outwardly until they are forcibly engaged with feet 238 of poles 236 in laminations 86 (FIG. 8A). Then fluid pressure is removed from port 109 and piston 138 is raised by spring 146. Arms 106 and 108 are slidably raised on post 100 about an inch, lifting lamination stack 92 from magazine 88. During this time, rotary actuator 114 imparts an additional 22½° rotation to mandrel 210 which causes lobes 218 to become centered on the inner edges 183 of blades 175, moving blades 175 radially outwardly, causing alignment keys 179 to further enter openings 234 and at the same time causing outer blade edges 181 to be urged forcefully against the feet 238 (FIG. 4A) along the entire length of stack 92 to prevent any laminations from "springing" free of fingers 198. Due to the arcuate configuration of lobes 222, fingers 198 are maintained in their outward radial position during the additional 22½° rotation of mandrel 210. Post 100 and arms 106 and 108 are then rotated 180° by rotator 102. The stack 92 is then deposited at a second processing station where, under pressure, cleating and welding of the stack may take place. The stack 92 is released when actuator 114 applies a reverse rotation of 67½° to mandrel 210 thereby placing it at the starting position. At this point, plungers 176 and 186 move arbor blades 175 radially inwardly against flats 216 and plungers 202 move fingers 198 radially inwardly against flats 220 on mandrel 210 thereby releasing stack 92. The arms 106 and 108 are then rotated 180° back to their initial position where aother stack 92 may be selected.

Figure 9:
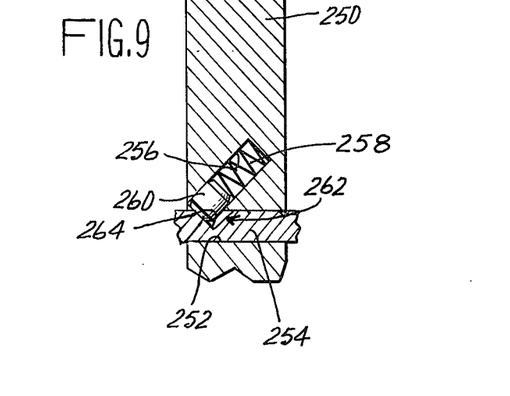
FIG. 9 is a partial, sectioned view of an alternate manner of mounting the pick-off fingers.

An alternate embodiment is shown in FIG. 9 wherein the pick-off fingers are mounted in the arbor blades instead of in the tubular mandrel 210. Arbor blade 250 has a horizontal bore 252 which supports in reciprocable sliding relation a finger 254. Blade 250 also has an angular bore 256 which receives spring 258 and plunger 260 in reciprocable sliding relation. A V-notch 262 is formed in finger 254 and plunger 260 rides against an inclined side 264 of notch 262 to urge finger 254 in a leftward, radially inward direction. The inner, or leftward, end of finger 254 rides against cam surfaces 220 and 222 and is movable radially outwardly as previously described for fingers 198, against the resilient pressure exerted by plunger 260. It is to be understood that fingers 254 would be mounted in a plurality of arbor blades 250 to exert a gripping force against the inner edges of laminations 86.

Figures 10, 11, 12:
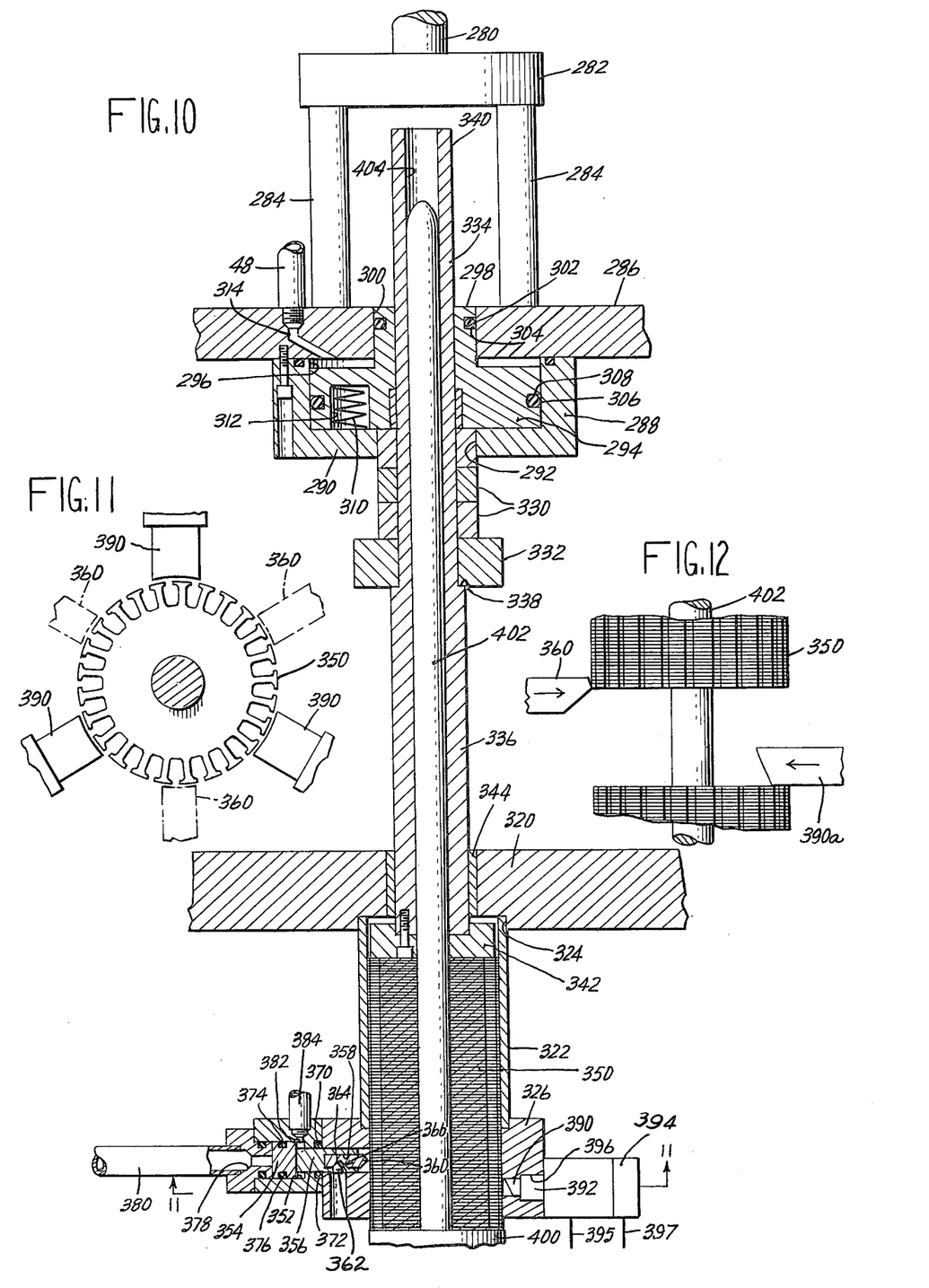
FIG. 10 is a partial, sectioned view of a further embodiment of this invention.
FIG. 11 is a partial section taken at 11—11 of FIG. 10.
FIG. 12 is an enlarged, partial view of the embodiment of FIG. 10 showing a pick-off and a retaining finger during lifting of the lamination stack.

A further embodiment is shown in FIGS. 10–12 wherein the pick-off fingers and retaining means are operated with fluid pressure instead of a mechanical camming member. A post 280 is mechanically coupled to post 56 (FIG. 1) and is movable reciprocably in a vertical direction thereby. Post 280 is affixed, as by welding, to a plate 282 to which is affixed a plurality of pillars 284 which depend therefrom. The lower end of pillars 284 are affixed to an upper arm 286, which corresponds to arm 106, FIG. 2, and is similarly supported to sleeve 104, and to which is bolted cylinder casing 288 having an inwardly formed annular lip 290 defining an opening 292. Piston 294 is reciprocably and slidably mounted in a cylinder 296 formed in casing 288. A piston stem 298 is reciprocably and slidably mounted in an opening 300 in arm 286. An 0-ring 302 is seated in a peripheral groove 304 in stem 298 and an 0-ring 306 is seated in a peripheral groove 308 in piston 294 in fluid sealing relation with cylinder 296. A spring 310 is received in a bore 312 in piston 294 to urge piston 294 in an upward direction. A passage 314 is formed in arm 286 and is connected in fluid communication with line 48 through valve 38 to pressure source 30.

Lower arm 320 corresponds to arm 108 in FIG. 2 and is similarly supported to sleeve 104. A lamination sleeve 322 is fitted in a cylindrical recess 324 in the lower surface of arm 320 and affixed thereto. The lower end of sleeve 322 is affixed to housing 326 later described.

Spacer rings 330 and spacer support ring 332, along with piston 294, are reciprocably and slidably mounted on a portion 334 of a tubular pressure post 336. Portion 334 extends from a shoulder 338 on post 336 to the upper end 340 of post 336. The lower end of post 336 is bolted to a pressure ring 342. Post 336 is reciprocably mounted through a bore 344 in arm 320. As will become apparent, the pressure from piston 298 is transmitted through spacer rings 330, ring 332, post 336, and ring 342 to the uppermost lamination 86 in lamination magazine column 350. Also, as will become apparent, the height of the lamination stack selected from magazine 350 may be varied by varying the vertical dimension of spacer rings 330.

Housing 326 has a cylinder 352 formed therein in which is mounted for reciprocable and slidable movement a piston 354 which has a hub 356 affixed at the inner radial end thereof. Socket 358 is formed in the end of nub 356 and receives a finger 360 which is held in hub 358 by a set screw 362 threadedly mounted in nub 358. Screw 362 bears aganst slope 364 of a V-notch 366 formed in finger 360.

0-ring 370 is seated in groove 372 formed in housing 326 and acts as a fluid seal. 0-ring 374 is seated in perpheral groove 376 formed in piston 354 and also acts as a fluid seal. Fluid pressure from source 30 is selectively applied to port 378 is housing 326 through line 380 to urge piston 354 in a rightwardly direction. Fluid pressure from source 30 is also selectively applied to port 382 in housing 326 through line 384 to move piston 354 in a leftwardly direction. There are three fingers 360, each being mounted and actuated as described, equally spaced about the periphery of housing 326.

A retainer finger 390 is affixed to a piston rod 392. Piston rod 392 is reciprocably mounted in and movable by a double-acting cylinder 394 and is movable radially inwardly to the position 390a shown in FIG. 12 by selective application of fluid pressure to cylinder 394 through fluid lines 395 and 397. Cylinder 394 is affixed to housing 326. Application of fluid pressure through line 397 will cause rod 392 to move radially inwardly in a leftward direction and application of fluid pressure in line 395 will cause rod 392 and finger 390 to move radially outwardly in a rightward direction. There are three fingers 390, each being mounted and actuated as described, equally spaced about the periphery of housing 326 (FIG. 11).

A bottom ram 400, which is mounted on a base, not shown, has an upstanding ram pin 402 affixed thereto which extends in reciprocable sliding relation into tube shaft 404 of tube 336. Annular laminations 86 are aligned and stacked on pin 402 prior to its insertion in shaft 404 to form lamination column 350 from which a stack height of laminations will be selected in operation of this embodiment, next described.

In operation of the embodiment shown in FIGS. 10–12, fluid pressure is selectively applied to lower post 280 and to force piston 294 downwardly in cylinder 296 against annular lip 290, applying a predetermined pressure through spacer rings 330, ring 332, post 336, and ring 342. Thus, a pressure is exerted between ring 342 and ram 400 to compress the laminations in column 350 thereby removing irregularities. The force exerted on piston 294 is greater than the force applied to post 280. While the pressure is being applied, fluid pressure is applied to line 380 to each of the pistons 354 in housing 326 causing each of the fingers 360 to exert an inward radial pressure to a lamination in column 350. Then the fluid pressure is relieved from cylinder 296, whereby spring 310 raises piston 294 releasing pressure from ring 342 on the lamination column. Fluid pressure is applied to raise post 280 causing the stack of laminations above fingers 360 to be lifted from column 350. While the lamination stack is being lifted about one inch, pressure is applied to line 397 to cause fingers 390 to move radially inwardly to position 390a as shown in FIG. 9 to thereby provide lamination retention so that any laminations falling from the lamination stack as it is being lifted would be captured by the fingers 390 in their position 390a. Post 280 is raised until pin 402 is removed from shaft 404. Arms 286 and 320 are then moved as by rotation to a second station wherein the lamination stack is released by removal of fluid pressure in lines 380 and 397 and application of fluid pressure to lines 384 and 395 causing piston 354 and rod 396 to move radially outwardly. After the stack has been thus released, arms 286 and 320 are returned to their initial position wherein pin 402 is in registration with shaft 404. Lowering of post 280 will cause pin 402 to re-enter shaft 404 wherein the cycle is repeated and a second stack is selected.

While there have been described above the principles of this invention in connection with specific apparatus it is to be clearly understood that this description is made only by way of example and not as a limitation to the scope of the invention.

What is claimed is:

1. Apparatus for selecting a predetermined, axial distance of columnar annular laminations having radial slots formed in the annular surface for use in dynamoelectric machine cores comprising:

supporting means for receiving a plurality of laminations in columnar relation and for supporting one end of the column;

a first member;

first means for mounting said member in reciprocable relation along the columnar axis and for controlling said member in movable relation towards and away from said supporting means along the columnar axis;

a second member;

second means for mounting said second member in reciprocable relation to said first member along the columnar axis to engage the other end of said column and for exerting a selectively releasable force between said first member and said second member to releasably compress the laminations in said column; and pick-off means for selectively exerting a holding force to at least one lamination spaced a predetermined axial distance from said other end thereby defining a stack of laminations having a predetermined columnar dimension.

2. Apparatus according to claim 1 including:

retaining means for retaining the laminations in said stack upon movement of said first member in a direction away from said supporting means; and third means for mounting said retaining means in fixed axial relation to said first member.

3. Apparatus according to claim 2 including aligning means for maintaining rotational alignment of said laminations during retention of said laminations by said retaining means; and fourth means for mounting said aligning means in fixed axial relation to said first member.

4. Apparatus according to claim 1 wherein said pick-off means comprises a plurality of coplanar fingers mounted exteriorly of said laminations for reciprocable movement radially of said axis; fluid pressure means for releasably forcing said fingers inwardly toward said laminations in a lamination gripping relation.

5. Apparatus according to claim 2 wherein:

said pick-off means comprises a first plurality of coplanar fingers mounted exteriorly of said laminations for reciprocable movement radially of said axis; fluid pressure means for releasably forcing said fingers inwardly toward said laminations in a lamination gripping relation; and said retaining means comprises a second plurality of coplanar fingers mounted exteriorly of said laminations for reciprocable movement radially of said axis; the plane of said second plurality being between the plane of said first plurality and said supporting means.

6. Apparatus according to claim 1 including an axially aligned tubular elongate mandrel mounted at one end in force transmitting relation to said first member; said pick-off means comprises a plurality of fingers mounted adjacent the distal end of said mandrel for reciprocable movement radially of said axis;

a plurality of elongate axially parallel slots being formed in said mandrel;

an elongate arbor blade being mounted in each of said slots for movement radially of said axis;

an elongate axially aligned camming mandrel having first and second pluralities of camming lobes formed thereon being inserted in said tubular mandrel;

rotating means for mounting said camming mandrel in rotatable relation to said tubular mandrel and for rotating said camming mandrel relative said tubular mandrel;

said first plurality of lobes being registrable with said fingers to impart outward radial movement to said fingers upon a first arcuate rotation of said camming mandrel; and said second plurality of lobes being registrable with said blades to impart an outward radial force to said blades upon a second arcuate rotation of said camming mandrel.

7. Apparatus according to claim 6 including:

first resilient means for resiliently urging said fingers radially inwardly; and second resilient means for resiliently urging said arbor blades radially inwardly.

8. Apparatus according to claim 6 including coupling means for coupling the second member in force transmitting relation to said other end of said column.

9. Apparatus according to claim 8 wherein said coupling means comprises a pressure ring engageable with said other end of column; adjustment means for adjusting the distance between said ring and said second member thereby adjusting said predetermined axial distance.

10. Apparatus according to claim 1 including adjustment means for adjusting said predetermined axial distance.

11. Apparatus according to claim 1 including transfer means for transferring the retained laminations from a first station to a second station.

12. Apparatus according to claim 1 wherein said first member has a cylinder formed therein opening towards said supporting means; said second member comprises a piston axially reciprocable in said cylinder; releasable fluid pressure means for applying a fluid pressure in said cylinder to force said piston towards said supporting means.

13. Apparatus according to claim 1 wherein said first means comprises a double-acting fluid pressure means for moving said first member towards and away from said supportng means.

14. Apparatus according to claim 6 wherein said pick-off fingers are mounted in said tubular mandrel for reciprocable movement radially of said axis.

15. Apparatus according to claim 6 wherein said fingers are mounted in said arbor blades for reciprocable movement radially of said axis.

16. Apparatus according to claim 6 including aligning means for aligning the slots in said laminations; said aligning means comprising elongate aligning keys being affixed to and extending radially outwardly from the outer ends of said arbor blades; the arcuate width in a transverse plane of each of said keys corresponding to the width of said lamination slots; the transverse spacing between said keys corresponding to the spacing between said lamination slots the transverse width of said blades exceeding the width of said lamination slots, whereby said keys are insertable in said slots and said blades are blocked from entry into said slots.

17. Apparatus according to claim 1 wherein said first means applies a first force to said first member to move said first member towards said supporting means; and said second means applies a second force to said second member exceeding said first force.

18. Apparatus according to claim 6 wherein said rotating means comprises means for rotating said camming mandrel relative to said tubular mandrel in successive arcuate segments.

19. The apparatus of claim 7 wherein each of said pick-off fingers comprise an elongate bar having a V-notch formed intermediately on one side thereof; said first resilient means comprises a plunger mounted for reciprocable movement transversely of said V-notch; a spring member mounted at one end of said plunger to resiliently urge the opposite end of said plunger against an inclined surface of said V-notch to resiliently urge said fingers radially outwardly of the column axis.

20. The apparatus of claim 7 wherein each of said arbor blades have a V-notch formed at opposite ends thereof; said second resilient means comprises a plunger mounted for reciprocable movement transversely of each of said V-notches in each of said blades; a spring member operable against one end of each of said plungers to urge the opposite ends of said plungers against an inclined surface of said V-notches thereby resiliently urging said arbor blades radially outwardly of the column axis 21. The apparatus of claim 6 wherein said first plurality of lobes have an arcuate section greater than the arcuate section of said second plurality of lobes whereby said fingers will be maintained in their outer radial positions for a period longer than the period of outward radial position of said blades during rotation of said camming mandrel.

22. Apparatus for selecting a predetermind axial distance of columnar annular laminations having radial slots formed in the annular surface for use in a dynamoelectric machine core comprising:

first means for stacking a plurality of laminatIons to form a column of laminations;

second means for applying a compressive force to said column to remove lamination irregularities;

third means for gripping a lamination a predetermined axial distance along said column while said second means maintains said compressive force to define a lamination stack corresponding to said axial distance;

fourth means for releasing the compressive force while said third means maintains said gripping force;

fifth means for separating the lamination stack while said third means is maintaining said gripping force and after said fourth means has released said compressive force.

* * * * *

UNITED STATES PATENT AND TRADEMARK OFFICE
CERTIFICATE OF CORRECTION

PATENT NO. : 4,079,512
DATED : March 21, 1978
INVENTOR(S) : Lee J. Lakes

It is certified that error appears in the above-identified patent and that said Letters Patent are hereby corrected as shown below:

| | |
|---|---|
| Col. 1, line 35, | "cam" should be --ram--. |
| Col. 3, line 57, | "whereIn" should be --wherein--. |
| Col. 4, line 4, | "alternative" should be --alternate--. |
| Col. 4, line 28, | "25" should be --26--. |
| Col. 6, line 12, | "sealed" should be --seated--. |
| Col. 8, line 11, | "130" should be --230--. |
| Col. 8, line 58, | "aother" should be --another--. |
| Col. 9, line 54, | "hub" should be --nub--. |
| Col. 9, line 56, | "aganst" should be --against--. |
| Col. 9, lines 59-60, | "perpheral" should be --peripheral--. |

IN THE CLAIMS

Claim 22, col. 14, line 7, "laminatIons" should be --laminations--.

Signed and Sealed this

Fourth Day of July 1978

[SEAL]

Attest:

RUTH C. MASON
Attesting Officer

DONALD W. BANNER
Commissioner of Patents and Trademarks